US012619533B1

(12) United States Patent
Sharon et al.

(10) Patent No.: US 12,619,533 B1
(45) Date of Patent: May 5, 2026

(54) DATA STORAGE DEVICE AND METHOD FOR NON-BALANCED MAPPING FOR VARIABLE READ RESOLUTION

(71) Applicant: Sandisk Technologies, Inc., Milpitas, CA (US)

(72) Inventors: Eran Sharon, Rishon Lezion (IL); Ariel Navon, Revava (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 19/035,262

(22) Filed: Jan. 23, 2025

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
CPC ..................... G06F 12/0246; G06F 2212/7201
See application file for complete search history.

(56) References Cited

U.S. PATENT DOCUMENTS

| | | | | |
|---|---|---|---|---|
| 8,996,793 | B1 * | 3/2015 | Steiner .............. | H03M 13/6306 711/103 |
| 9,395,927 | B2 | 7/2016 | Pekny | |
| 11,853,572 | B2 | 12/2023 | Gopalakrishnan et al. | |
| 2014/0013033 | A1 * | 1/2014 | Sharon ................ | G11C 11/5628 711/103 |
| 2014/0157086 | A1 * | 6/2014 | Sharon ................ | G06F 11/1012 711/163 |
| 2015/0378801 | A1 * | 12/2015 | Navon .................. | G06F 11/076 714/704 |
| 2021/0132818 | A1 | 5/2021 | Hallak et al. | |

FOREIGN PATENT DOCUMENTS

KR 101206820 6/2012

OTHER PUBLICATIONS

U.S. Appl. No. 19/035,315, filed Jan. 23, 2025 entitled "Data Storage Device and Method for Bit Error Rate (BER) Balancing Based on Dynamic Sense Time."
U.S. Appl. No. 18/945,932, filed Nov. 13, 2024 entitled "Data Storage Device and Method for Direct Data Organization in Multi-Level-Cell Memory."

(Continued)

*Primary Examiner* — Kevin Verbrugge
(74) *Attorney, Agent, or Firm* — Crowell & Moring LLP

(57) ABSTRACT

Data is often stored in a multi-level memory (e.g., a quad-level cell (QLC)) using a mapping that balances the bit error rate among the various pages in the memory. The number of sense operations needed to read each page is also relatively balanced. The data storage device presented herein can decide to store data using a non-balanced mapping if there is a desire to later read a low-resolution version of the data. With a non-balanced mapping, fewer sense operations are needed to read the lower page of data, which contains the low-resolution version of the data. Other pages can be read if a higher-resolution version of the data is desired, and techniques can be used to mitigate the higher bit error rate that may be encountered in those other pages because of use of the non-balanced mapping.

20 Claims, 7 Drawing Sheets

4-3-4-4 BER-Balanced Mapping

1-2-4-8 Non-Balanced Mapping

(56)                    References Cited

OTHER PUBLICATIONS

U.S. Appl. No. 18/230,576, filed Aug. 4, 2023 entitled "Computational Storage Device with Computational Precision-Defined Fixed Point Data Grouping and Storage Management."

Courbariaux, Matthieu et al.; "Binarized Neural Networks: Training Neural Networks with Weights and Activations Constrained to +1 or <1"; downloaded from the Internet on Jan. 23, 2025 at https://arxiv.org/abs/1602.02830; arXiv:1602.02830; Feb. 9, 2016; 11 pages.

Jiang, Chutian; "Efficient Quantization Techniques for Deep Neural Networks"; downloaded from the Internet on Jan. 23, 2025 at https://ieeexplore.ieee.org/document/9707043; 2021 International Conference on Signal Processing and Machine Learning (CONF-SPML); Stanford, California; Nov. 14, 2021, 7 pages.

Mishra, Rahul et al.; "A Survey on Deep Neural Network Compression: Challenges, Overview, and Solutions"; downloaded from the Internet on Jan. 23, 2025 at https://arxiv.org/abs/2010.03954; arXiv:2010.03954; Oct. 5, 2020; 19 pages.

Peng, Fu et al.; "Training Quantized Deep Neural Networks via Cooperative Coevolution"; downloaded from the Internet on Jan. 23, 2025 at https://arxiv.org/pdf/2112.14834; arXiv:2112.14834v3; InInternational Conference on Sensing and Imaging; Jun. 26, 2022; 13 pages.

"Quantization"; Guidance documentation webpage; downloaded from the Internet on Jan. 23, 2025 at https://pytorch.org/docs/stable/quantization.html; The Linux Foundation, PyTorch Contributors; 2023; 15 pages.

Brookes, Tim; "What Is Dynamic Resolution Scaling (DRS)?"; downloaded from the Internet on Nov. 13, 2024 at https://www.howtogeek.com/764408/what-is-dynamic-resolution-scaling-drs/; Nov. 14, 2021; How-To Geek; Valnet Publishing Group; 8 pages.

Ponti, M. et al.; "Compact Color Features with Bitwise Quantization and Reduced Resolution for Mobile Processing"; downloaded from the Internet on Nov. 13, 2024 at Ponti MobileImagingSIP2013.pdf; InProceedings 2013; 4 pages.

"TensorFlow: An end-to-end platform for machine learning"; product page; downloaded from the Internet on Nov. 13, 2024 at https://www.tensorflow.org; Oct. 28, 2024; 10 pages.

Wang, Cheng et al.; "Channel Modeling and Quantization Design for 3D NAND Flash Memory"; Entropy, vol. 25; Jun. 21, 2023; 17 pages.

Non-final Office Action mailed Oct. 1, 2025 for U.S. Appl. No. 18/945,932.

Yue, J. et al; "Reducing Read Latency in MLC PCM"; In2016 IEEE International Conference on Networking, Architecture and Storage (NAS); IEEE; Aug. 8, 2016; 6 pages.

* cited by examiner

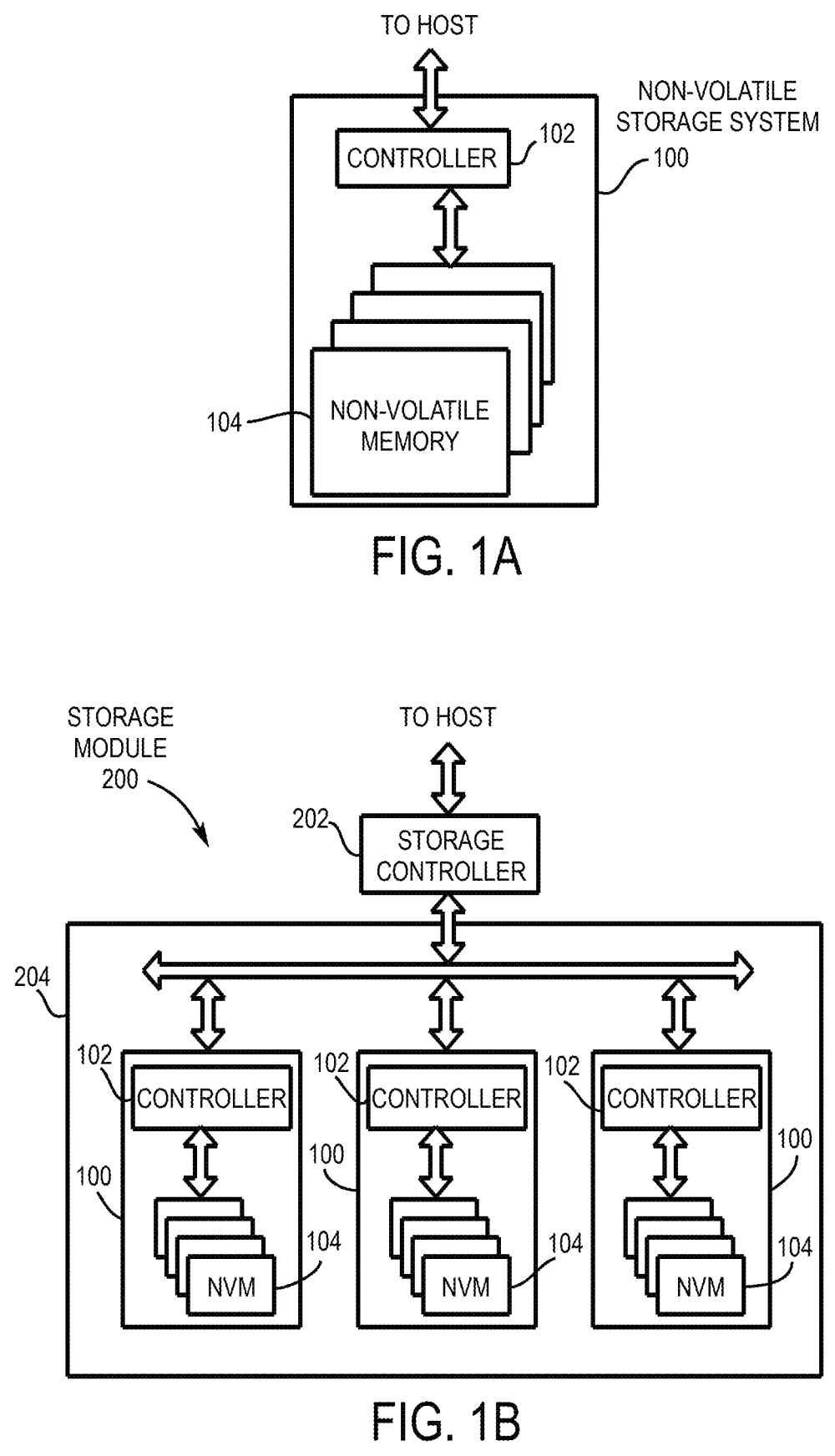

TO HOST

NON-VOLATILE
STORAGE SYSTEM
100

CONTROLLER 102

104 NON-VOLATILE
MEMORY

FIG. 1A

STORAGE
MODULE
200

TO HOST

202 STORAGE
CONTROLLER

204

102 CONTROLLER  102 CONTROLLER  102 CONTROLLER 100  100  100

104 NVM  104 NVM  104 NVM

FIG. 1B

4-3-4-4 BER-Balanced Mapping

1-2-4-8 Non-Balanced Mapping

DATA STORAGE DEVICE AND METHOD FOR NON-BALANCED MAPPING FOR VARIABLE READ RESOLUTION

BACKGROUND

A memory of a data storage device can contain memory cells that store more than one bit of data per cell. For example, a quad-level cell (QLC) can store four bits of data. The four bits of data in a QLC cell belong to four pages (a lower page, a middle page, an upper page, and a top page), and a mapping can be used to store data in the various logical pages. For example, using a 4-4-3-4 mapping, the data is written into a QLC cell in such a way that the lower, middle, and top pages can be read by sensing the cell voltage in four steps, whereas the upper page can be read by sensing the cell voltage in three steps. With this mapping, the number of transitions between adjacent states is divided approximately equally between the logical pages. Because the bits representative of adjacent states differs from each other only by one bit, this mapping can be used to balance the bit error rate (BER) among the pages.

BRIEF DESCRIPTION OF THE DRAWINGS

FIG. 1A is a block diagram of a data storage device of an embodiment.

FIG. 1B is a block diagram illustrating a storage module of an embodiment.

DETAILED DESCRIPTION

The following embodiments generally relate to a data storage device and method for non-balanced mapping for variable read resolution. In one embodiment, a data storage device is provided comprising a memory comprising multi-level memory cells and one or more processors. The one or more processors, individually or in combination, are configured to: determine whether there is a need for providing a low-resolution version of data; in response to determining that there is not a need for providing a low-resolution version of the data, store the data in the memory using a first mapping; and in response to determining that there is a need for providing a low-resolution version of the data, store the data in the memory using a second mapping, wherein reading only a lower page of the data provides the low-resolution version of the data, and wherein fewer memory sense operations are needed to read the lower page when the data is stored using the second mapping than when the data is stored using the first mapping.

In another embodiment, a method is provided that is performed in a data storage device comprising multi-level memory cells. The method comprises: determining whether data is designated for reading with dynamic read resolution; and in response to determining that the data is designated for reading with dynamic read resolution, storing the data in the memory using a non-BER (bit-error-rate) balanced mapping, wherein fewer memory sense operations are needed to read a lower page of the data when the data is stored using the non-BER-balanced mapping instead of a BER-balanced mapping.

In yet another embodiment, a data storage device is provided comprising: a memory comprising multi-level memory cells; and means for: selecting a mapping from a plurality of mappings based on whether the data is designated for variable read resolution; and writing the data in the memory using the selected mapping.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1C:
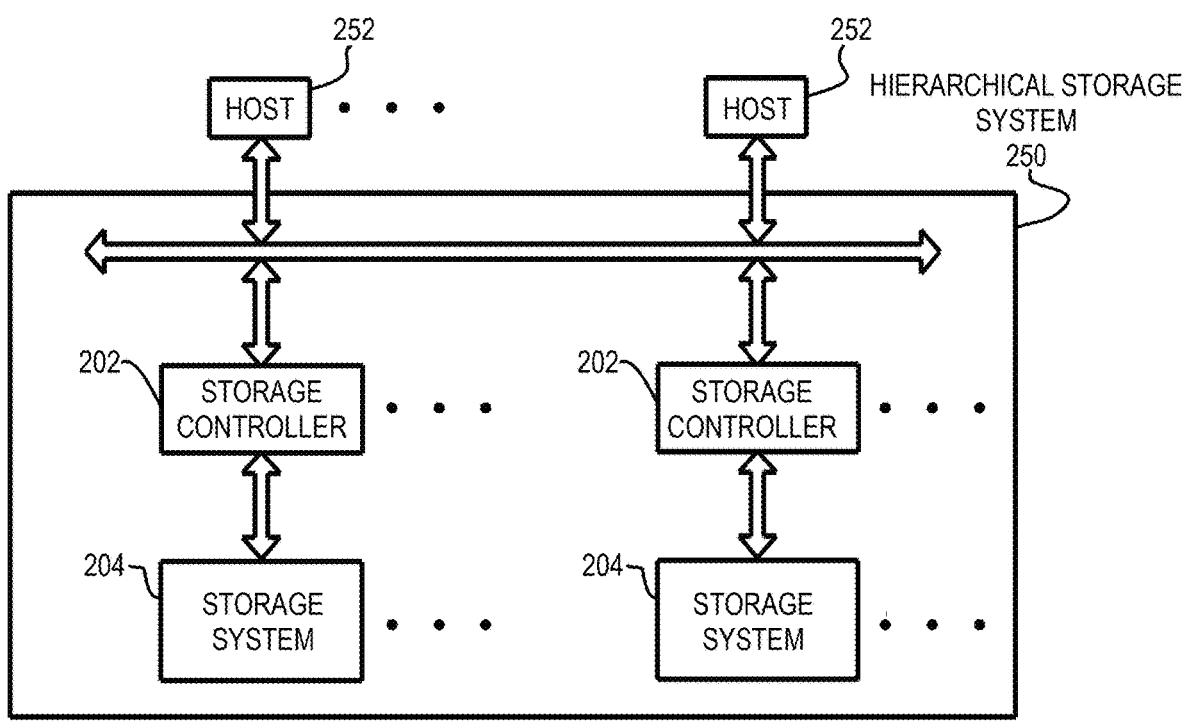
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
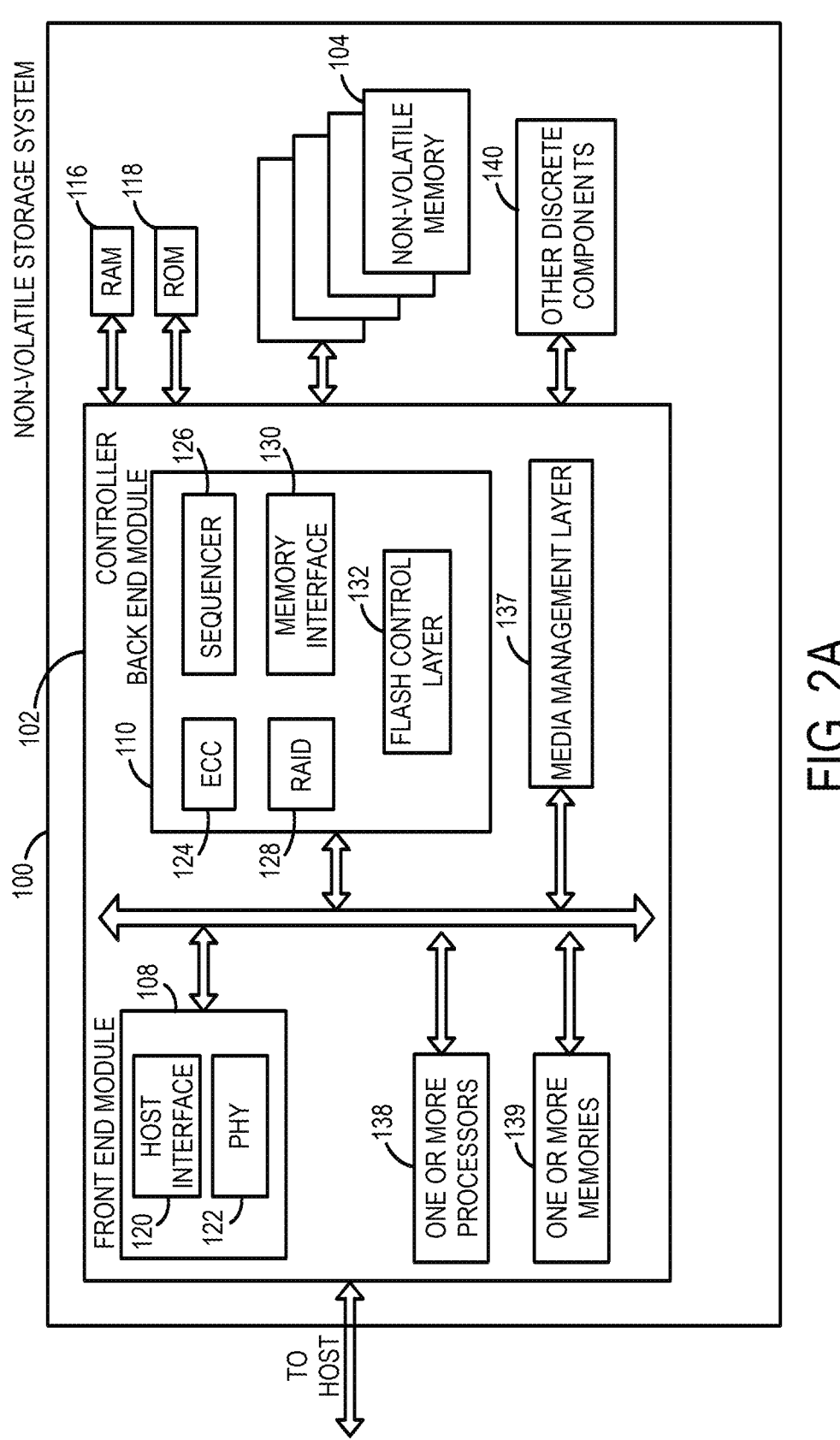
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/ or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
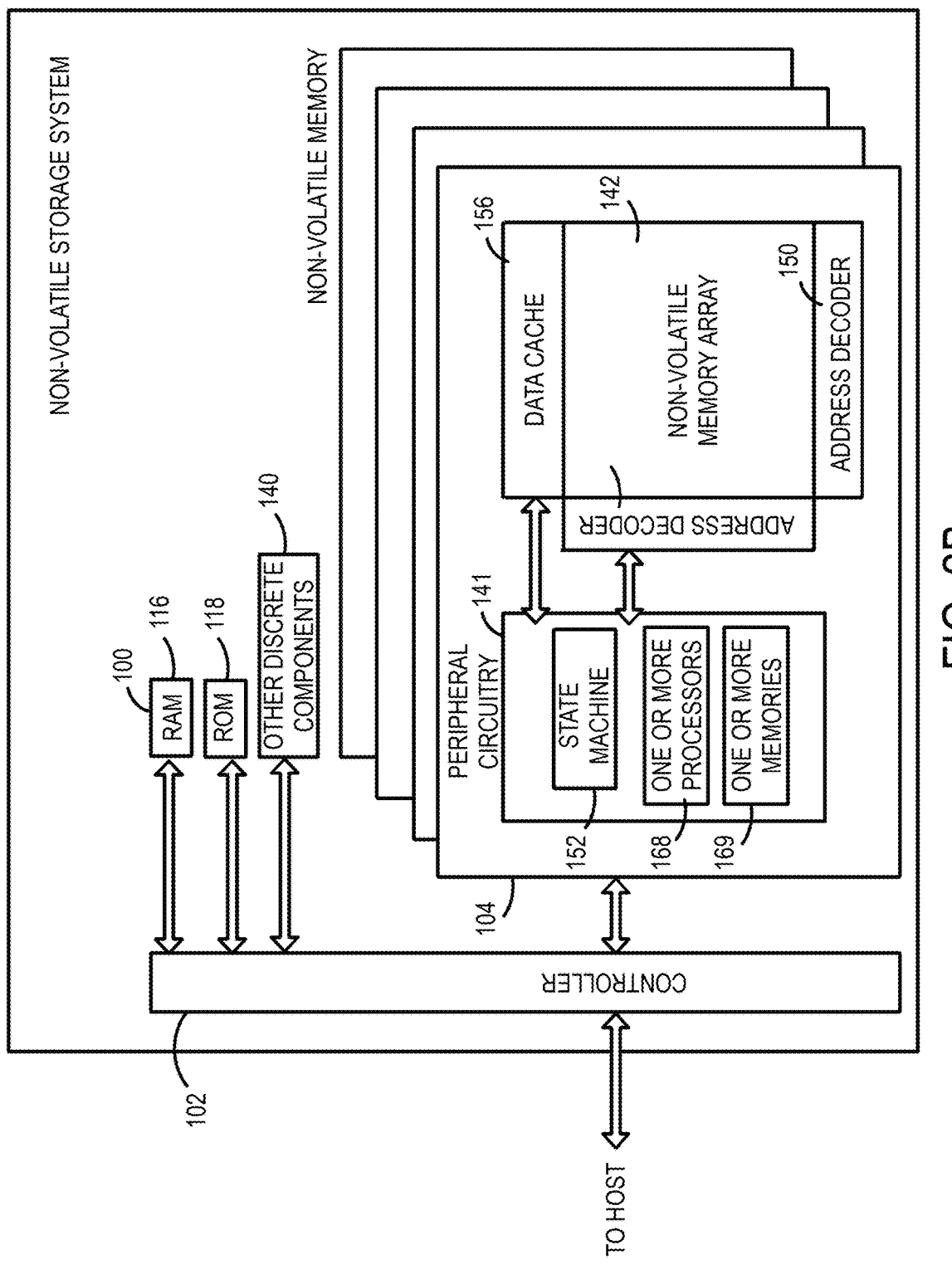
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
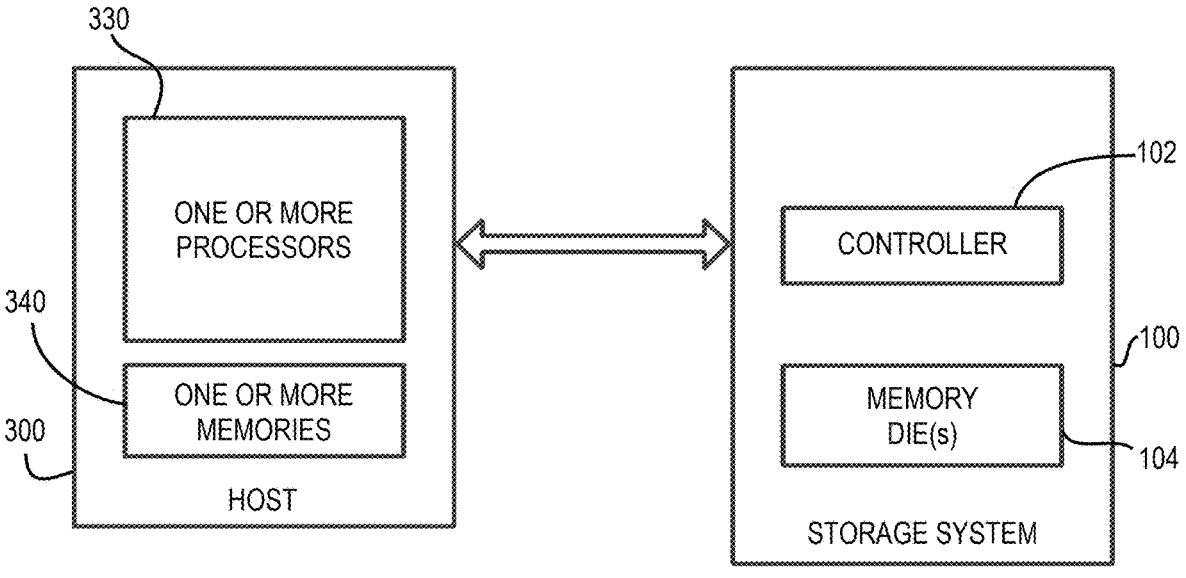
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

In one embodiment, the memory 104 of the data storage device 100 can comprise matrices of storage (memory) cells. Each of these cells can be a single-level cell (SLC), which can store a single bit per cell. or a multi-level cell (MLC), which can store more than one bit per cell, based on the storage technology. When an MLC memory stores three or four bits per cell, the memory may be referred to as a triple-level cell (TLC) memory or a quad-level cell (QLC) memory, respectively. The following examples will be described in terms of QLC memory, but it should be understood that any suitable memory technology, now available or later developed, can be used. For example, other number of bits-per-cell technologies (e.g., TLC) can be used.

There are multiple ways to store and retrieve data in QLC cells, which can be organized in pages and blocks. In this example, the write and read operations are performed at a page level, and a page is 16 KB. Four bits in a QLC cell belong to four pages: a lower page, a middle page, an upper page, and a top page. With four 16 KB pages, each page can hold 4,096 samples of data, where each sample (e.g., a single element of a 32-bit vector) is 32 bits (i.e., each sample is stored in 32 cells, and each bit is stored in a separate cell). All four pages can be available when a write operation is performed in a QLC cell. The four-bit content of the QLC cell can be represented as a voltage value in the charge gate of the QLC cell. This voltage representation of bit values can be arranged in such a way that the individual bits of the stored number can be detected in a minimum number of steps of voltage sense operations.

Figure 4:
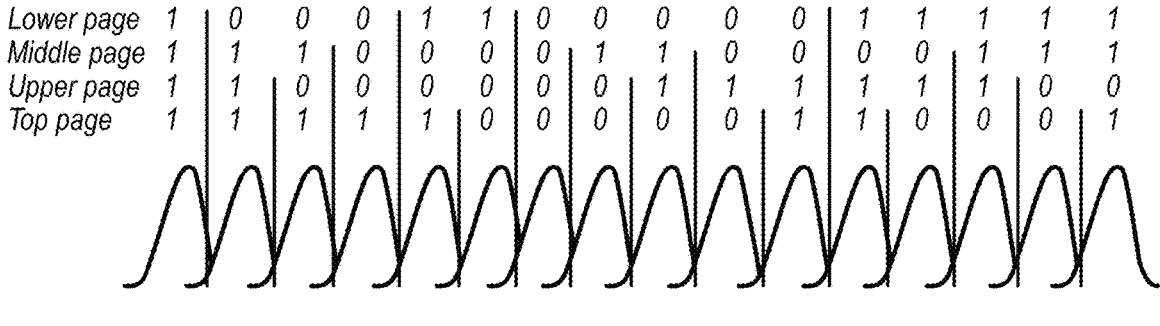
FIG. 4 is an illustration of a 4-3-4-4 bit error rate (BER) balanced mapping of an embodiment.

A logical bit mapping (coding scheme) can be used to store data in the various logical pages of a multi-bit memory cell. For example, bit error rate (BER) balanced mapping can be used to equalize both the reliability of the logical pages (i.e., the vulnerability of the different logical pages to erroneous bit-flips) and the latency of the read from the different logical pages. For example, a 4-4-3-4 coding mechanism is a standard bit mapping for a QLC cell (e.g., used in a BiCS5 memory array). In a 4-4-3-4 coding mechanism (see FIG. 4), the data is written into a QLC cell in such a way that the lower, middle, and top pages can be read by sensing the cell voltage in four steps, whereas the upper page can be read by sensing the cell voltage in three steps. This standard mapping can be a Gray mapping in which the bits representative of adjacent states differs from each other only by one bit. This characteristic of Gray mapping also improves memory reliability, as the number of transitions between adjacent states is divided approximately equally between the logical pages. While this mapping is sometimes referred to as balanced mapping, it should be noted that this "balanced" mapping is not really balanced in that the middle page has three transitions while the other pages have four transitions. Also, while a 4-3-4-4 mapping is used in this example, this issue can also occur in other fairly-balanced mappings. "Data Storage Device and Method for Bit Error Rate (BER) Balancing Based on Dynamic Sense Time," U.S. patent application Ser. No. 19/035,315, filed on Jan. 23, 2025 which is hereby incorporated by reference, describes way to mitigate the inherent BER difference between the logical pages in a "balanced" mapping. While a standard 4-3-4-4 mapping has advantages in terms of reliability, the inventors have recognized that using a non-standard mapping (e.g., 1-2-4-8) can be advantageous in certain situations. More specifically, while using non-standard mapping can result in the stored data being less reliable as compared to using standard mapping, using non-standard mapping can provide significantly-reduced latency and power consumption, which may be desired in several applications. In one embodiment, the data storage device 100 is configured to select which mapping (e.g., a standard 4-3-4-4 mapping or a non-standard 1-2-4-8 mapping) to use to write data in the memory 104, either when the data is received from the host 300 or when previously-stored data in re-written in the memory 104 using a different mapping. This provides the data storage device 100 with variable read resolution capability.

There are several use cases that can benefit from the flexibility of the data storage device 100 being capable of multi-resolution reads from the memory 104. For example, using different resolution/quantization can be useful for machine learning models (e.g., using dynamic/lower resolution to represent the model's parameters with a different number of bits). Another example use case is reading an image from memory 104 in a lower resolution for preliminary visualization purposes (e.g., image down sampling, such as when a small-sized image (a "thumbnail") is used to represent a full-size image stored in the memory 104).

Challenges may be presented in allowing a faster read of lower resolution data from the memory 104. For example, in the machine learning/artificial intelligence context, if 1/2/4/ 8/32/64 bits per a one model-parameter value are used, more bits are needed to represent each model's parameter. While the calculation may be more accurate, the calculation can be memory consumptive and more computationally expensive. As another example, in the image/video data context, 1 to 32 bits can be used to represent each image pixel. The following is a list of some common color depths and the corresponding number of bits per pixel:

1-bit: black and white (two colors)
8-bit: 256 colors (grayscale)
16-bit: 65,536 colors (high-color)

24-bit: 16.7 million colors (true color)
32-bit: 4.3 billion colors (with an alpha channel for transparency)

In one embodiment, an improved approach is provided based on utilizing a non-standard mapping (e.g., a non-balanced Grey mapping of 1-2-4-8) to store data such that reading a low-resolution version of data may be done with significantly lower (e.g., ~3X) latency and power consumption as compared to reading data stored using a standard mapping (e.g., a 4-2-4-4 mapping). It should be noted that while the following examples are described in terms of standard versus non-standard, or 4-2-4-4 mapping versus 1-2-4-8 mapping, any suitable mappings can be used. As such, the phrase "first mapping" and "second mapping" may be used herein, and any particular type of mapping (e.g., 4-2-4-4 or 1-2-4-8) should not be read into the claims unless expressly recited therein. Also, while the following example are described in terms of QLC memory, these embodiments can be used with any suitable type of memory.

In one example implementation, the data storage device 100 can use non-standard, non-balanced Gray mappings to allow a faster and lower-energy read of the frequently-used low-resolution data. By providing several resolution/quantization "gears"/options of reading data from the memory 104, these embodiments provide a flexible trade-off to maneuver between read latency/power and resolution of the read-data. In one example implementation, using a special bit mapping that allow for efficient maneuvering between read latency/power and resolution/quantization of the read content can provide a super-fast read for low-resolution data (e.g., up to 15× faster than a full-resolution read).

In one embodiment, the data storage device 100 can use a non-BER-balanced mapping for scenarios that include dynamic read resolution. In one example implementation, a 1-2-4-8 non-balanced bit mapping is used for partitions that support a flexible trade-off between read-latency/power and read-resolution. In some scenarios, non-balanced mapping may not be desired due to non-equal latency of the logical pages. However, in these situations, non-balanced mapping can be used to provide an efficient solution for faster reading of low-resolution content. As will be described below, several measures can be used to mitigate the non-balanced BER caused by using this non-conventional mapping.

Figure 5:
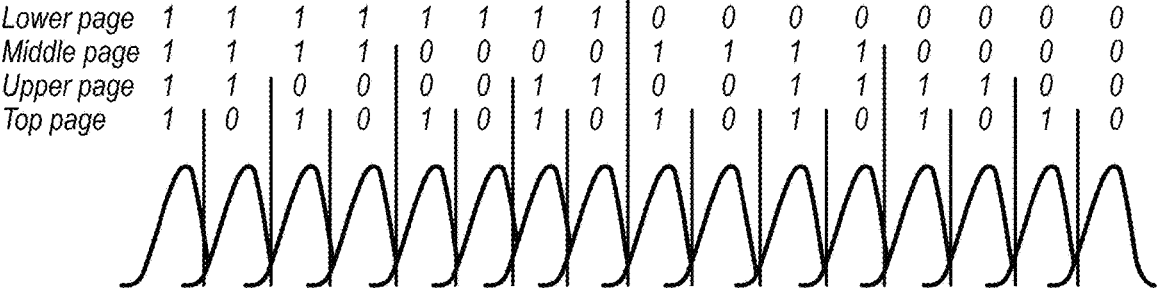
FIG. 5 is an illustration of a 1-2-4-8 non-balanced mapping of an embodiment.

Turning again to the drawings, FIG. 5 is an illustration of a 1-2-4-8 non-balanced mapping of an embodiment. With this mapping, the lower page has only one transition between adjacent states, the middle page has two transitions, the upper page has four transitions, and the top page has eight transitions. This 1-2-4-8 mapping includes one sense operation related to the lower page, two sense operations for the middle page, four sense operations for the upper page, and eight sense operations for the top page. Such mapping can result in non-equal properties of the logical pages. As a logical page can have a higher number of transitions between zeros and ones, it can have a greater vulnerability to bit-errors as well as a higher read latency (due to the higher number of related sense operation that are required to read its data).

For standard applications, the preferred setting may be to equalize both the latency and the reliability of the different logical pages, and, therefore, BER-balanced bit mappings may be desired. However, for use-cases that desire allowing faster reads with a lower resolution, non-balanced bit-mappings (e.g., 1-2-4-8 mapping) can be useful.

In one example, the controller 102 places the most significant bits of each model parameter or pixel of an image in the lower pages. Such data placement will allow a modular resolution read that can optimize the latency and power of frequently-used cases. For example, given that a high-resolution representation of a parameter of a deep neural network model includes 32 bits, the bits can be stored using a full-resolution model where each parameter is placed in four bits in eight cells. Overall, this provides 32 bits per one parameter. To apply a fast, low-resolution read of the model, the controller 102 can cause the memory 104 to apply only one sense operation to read only the lower page. For such a read, the read parameter is eight bits. In case a slightly higher resolution read is desired, the controller 102 can cause three sense operations to be applied to read the lower and middle pages to get a 16-bit value of the same parameter. The data storage device 100 can read in a 24- or 32-bit resolution in a similar manner.

The read of the lower page involves only one sense operation, whereas a full resolution read from a QLC device includes applying 15 senses operations. As such, the low-resolution fast read (of only the lower page) dramatically accelerates the read operation and reduces its power consumption. Given that low-resolution information may be sufficient most of the time and high-resolution information may be rarely required, these embodiments can significantly improve the overall performance of the data storage device 100 and reduce its power consumption.

While the different read latency of the different logical pages in a non-balanced Grey mapping is useful in many use cases, various approaches can be taken to address the increased BER that may be encountered in using a non-balanced 1-2-4-8 mapping. One approach is to apply the same amount of error correction code (ECC) parity protection for all logical pages and to limit the declared decoding capability according to the higher pages, which typically will have higher BER values. Another approach is to apply the same amount of ECC parity protection for all logical pages. That way, in the usually-rare case that the decoding fails at the higher logical pages (e.g., due to its increased vulnerability to bit-flips), the decode can return the read data as is. Given that such cases are read frequently enough, this approach may be acceptable for relevant use cases, such as applications of thumbnail previewing and even applications of inference with a low-resolution machine learning model (especially if users are often aware of degraded prediction performance for low-resolution models).

Another approach uses different parity allocation per logical page such that the ECC protection is balanced between the pages. This solution can be relatively more complicated than the approaches discussed above due to the need to support different codewords sizes. Yet another approach uses non-uniform voltage allocation of states such that the states near the active read thresholds of the top page will be more separated than the "active states" of the lower page, etc. The active states of logical pages that have a larger number of transitions between internal logical states (and more active states) can be placed in a larger voltage windows space, whereas the active states of the lower page, for example, can be placed more closely to each other such that the overall BER level of the pages can be more balanced.

In yet another approach, adapted sensing accuracy is applied to the specific page BER level. For example, reading of the lower page, which has lower BER level, can use more relaxed sense timing (making it even faster on top of having a single threshold to sense), while reading the top page, which has eight read thresholds and hence higher induced BER, can be done with longer sense timing, thereby leading to more accurate sensing that can reduce and balance the BER. The timing of the sensing can be controlled by longer/shorter stabilization time for the bitline voltage (VBL) and control gate voltage (Vcg) and by longer/shorter sense amplifier integration time, which can allow the BER of the sensed page to be controlled. In this way, the BER of the different pages can be balanced to some extent.

Figure 6:
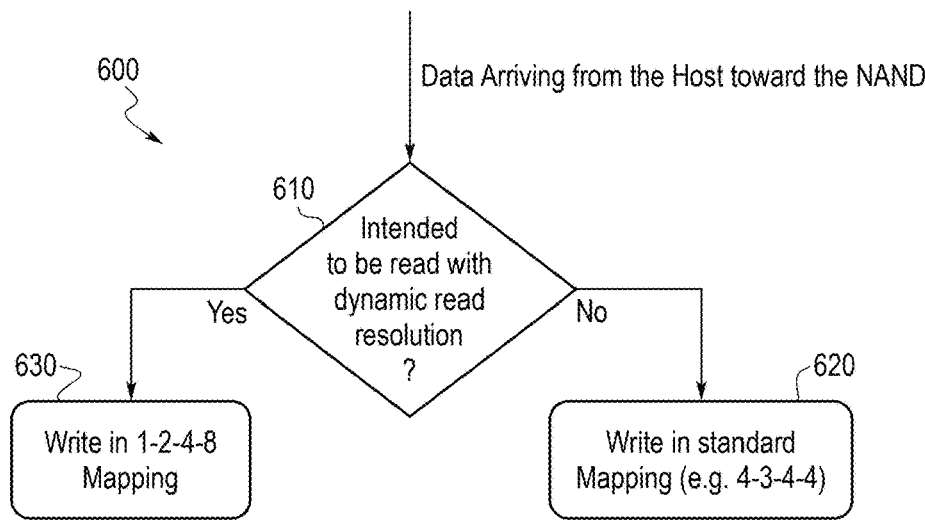
FIG. 6 is a flow chart of a method of an embodiment for writing data received from a host.

In one embodiment, the controller 102 of the data storage device 100 can determine which of first and second mappings (e.g., a standard 4-3-4-4 mapping or a non-standard 1-2-4-8 mapping) to use when storing data received from the host 300. The flow chart 600 in FIG. 6 illustrates this embodiment. As shown in FIG. 6, when data is received from the host 300 for storage in the memory 104 of the data storage device 100, the controller 102 of the data storage device 100 determines if the data is intended to be read with dynamic read resolution (610). This determination can be made in any suitable way. For example, the host 300 can provide an indication to the data storage device 100 either explicitly (e.g., using a flag, a vendor-specific code, an explicit instruction from the host 300 about the required mapping type (i.e., whether the data should be read faster in a lower resolution), etc.) or implicitly (e.g., by requesting that the data be stored in a logical partition that is designated for a low-resolution read, by an identification of the application on the host 300 that is sending the data, etc.).

If the controller 102 determines that the data is not intended to be read with dynamic read resolution, the controller 102 communicates with the memory 104 and causes the data to be written in standard mapping (e.g., 4-3-4-4 mapping) (620). However, if the controller 102 determines that the data is intended to be read with dynamic read resolution, the controller 102 communicates with the memory 104 and causes the data to be written in non-standard mapping (e.g., 1-2-4-8 mapping) (630).

Figure 7:
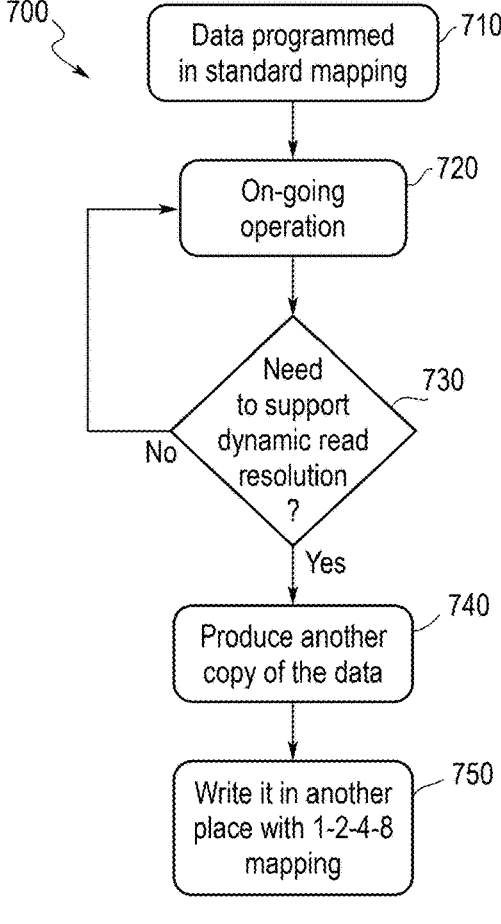
FIG. 7 is a flow chart of a method of an embodiment for re-mapping previously-written data.

Additionally or alternatively, the controller 102 of the data storage device 100 can re-map previously-written data. This embodiment is illustrated in the flow chart 700 in FIG. 7. As shown in FIG. 7, after data is programmed into the memory 104 using a standard mapping (e.g., 4-3-4-4 mapping) (710) and there is an on-going operation (720), the controller 102 determines whether there is a need to support dynamic read resolution (730). The controller 102 can make this determination in any suitable way. For example, the controller 102 can make this determination according to internal observation about common usage or in response to an explicit instruction from the host 300. If the controller 102 determines that there is no such need, the method loops back to 720, and no data re-mapping takes place. However, if the controller 102 determines that there is a need to support dynamic read resolution, the controller 102 produces another copy of the data (740) and stores that copy in another location in the memory 104 using a non-standard mapping (e.g., 1-2-4-8 mapping) (750). The original copy of the data can be kept or discarded.

There are several advantages associated with the embodiments. For example, these embodiments can provide an efficient way to store data inside the memory of a data storage device such that the data can be read in several levels of granularity/resolution/quantization and at several speeds. In one example implementation, the data storage device can provide an accelerated read rate of a lower-resolution version of stored data up to a factor of 16× compared to conventional QLC memory. Also, using dynamic/lower resolution of machine learning model weights can provide advantages over other possible solutions to the problems mentioned above. One such possible solution is to store several copies of the model's parameters in memory, where each copy is contained in a different resolution. This solution mitigates the overall throughput of loading model's parameters at the expense of cost (i.e., the storage volume required to hold a model). However, using dynamic/lower resolution of machine learning model weights can provide a reduction in latency that this solution does not.

Another possible solution to the issues discussed above is to arrange data in different logical pages and allow reading only of part of the logical pages. Hence, if a low-resolution read is required, only a single logical page may be sensed and transferred, which will contain the low-resolution data (e.g., the most-significant bits of the machine learning model weight or low-resolution pixel data of an image). This is described in more detail in U.S. patent application Ser. No. 18/945,932, which is hereby incorporated by reference. However, in some environments, the embodiments described above can provide advantages over the approach described in that patent document.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory comprising multi-level memory cells; and
one or more processors, individually or in combination, configured to:
   determine whether there is a need for providing a low-resolution version of data;
   in response to determining that there is not a need for providing a low-resolution version of the data, store the data in the memory using a first mapping; and
   in response to determining that there is a need for providing a low-resolution version of the data, store the data in the memory using a second mapping, wherein reading only a lower page of the data provides the low-resolution version of the data, and wherein fewer memory sense operations are needed to read the lower page when the data is stored using the second mapping than when the data is stored using the first mapping.

2. The data storage device of claim 1, wherein the first mapping comprises a 4-4-3-4 mapping and the second mapping comprises a 1-2-4-8 mapping.

3. The data storage device of claim 1, wherein the first mapping comprises a bit error rate (BER) balanced mapping and the second mapping comprises a non-BER-balanced mapping.

4. The data storage device of claim 1, wherein the determining is performed in response to the data being received from a host.

5. The data storage device of claim 1, wherein the determining is performed in response to re-mapping the data, which was previously stored in the memory using a different mapping.

6. The data storage device of claim 1, wherein most-significant bits of the data are stored in the lower page.

7. The data storage device of claim 1, wherein the low-resolution version of the data comprises a low-resolution version of a parameter of a machine learning model.

8. The data storage device of claim 1, wherein the low-resolution version of the data comprises a low-resolution version of an image.

9. The data storage device of claim 1, wherein the memory comprises a three-dimensional memory.

10. In a data storage device comprising multi-level memory cells, a method comprising:
   determining whether data is designated for reading with dynamic read resolution; and
   in response to determining that the data is designated for reading with dynamic read resolution, storing the data in the memory using a non-BER (bit-error-rate) balanced mapping, wherein fewer memory sense operations are needed to read page(s) of the data for a low-resolution read when the data is stored using the non-BER-balanced mapping instead of a BER-balanced mapping.

11. The method of claim 10, further comprising:
performing an operation to mitigate non-balanced BER caused by using the non-BER-balanced mapping.

12. The method of claim 11, further comprising:
reading a higher-resolution of the data by reading more pages of the data from the memory.

13. The method of claim 10, wherein the data comprises an image.

14. The method of claim 10, wherein the data comprises a parameter of a machine-learning model.

15. The method of claim 10, wherein the determining is performed in response to the data being received from a host.

16. The method of claim 10, wherein the determining is performed in response re-mapping the data, which was previously stored in the memory using a different mapping.

17. The method of claim 10, wherein the data is explicitly designated for reading with dynamic read resolution by a host.

18. The method of claim 10, wherein the data is implicitly designated for reading with dynamic read resolution by a host.

19. The method of claim 10, wherein the BER balanced mapping comprises a 4-4-3-4 mapping and the non-BER balanced mapping comprises a 1-2-4-8 mapping.

20. A data storage device comprising:
a memory comprising multi-level memory cells; and
means for:
   selecting a mapping from a plurality of mappings based on whether the data is designated for variable read resolution; and
   writing the data in the memory using the selected mapping.

* * * * *